(12) United States Patent
Kasuya

(10) Patent No.: US 12,262,147 B2
(45) Date of Patent: Mar. 25, 2025

(54) INFORMATION PROCESSING APPARATUS, INFORMATION PROCESSING METHOD, AND RECORDING MEDIUM

(71) Applicant: CANON KABUSHIKI KAISHA, Tokyo (JP)

(72) Inventor: Nozomu Kasuya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 621 days.

(21) Appl. No.: 17/518,389

(22) Filed: Nov. 3, 2021

(65) Prior Publication Data

US 2022/0060664 A1 Feb. 24, 2022

Related U.S. Application Data

(63) Continuation of application No. PCT/JP2020/018786, filed on May 11, 2020.

(30) Foreign Application Priority Data

May 17, 2019 (JP) ................. 2019-093733

(51) Int. Cl.
*H04N 7/18* (2006.01)
*H04N 23/61* (2023.01)
*H04N 23/67* (2023.01)
*H04N 23/695* (2023.01)
*H04N 23/90* (2023.01)
*H04N 23/951* (2023.01)

(52) U.S. Cl.
CPC ............. *H04N 7/181* (2013.01); *H04N 23/61* (2023.01); *H04N 23/675* (2023.01); *H04N 23/695* (2023.01); *H04N 23/90* (2023.01); *H04N 23/951* (2023.01)

(58) Field of Classification Search
CPC ...... H04N 7/181; H04N 23/61; H04N 23/675; H04N 23/695; H04N 23/90; H04N 23/951; H04N 17/002
See application file for complete search history.

(56) References Cited

U.S. PATENT DOCUMENTS

| 2008/0088706 A1* | 4/2008 | Girgensohn ............ H04N 7/181 |
| | | 348/207.99 |
| 2016/0050367 A1* | 2/2016 | Shimauchi ........... H04N 13/282 |
| | | 348/36 |
| 2017/0142341 A1* | 5/2017 | Ikeda .................... H04N 23/90 |

(Continued)

FOREIGN PATENT DOCUMENTS

| JP | 2006060425 A | 3/2006 |
| JP | 2018206025 A | 12/2018 |

(Continued)

*Primary Examiner* — Boubacar Abdou Tchoussou
(74) *Attorney, Agent, or Firm* — Canon U.S.A., Inc. IP Division

(57) ABSTRACT

An information processing apparatus 10 determines the positions and orientations of a plurality of image capturing apparatuses 11, which capture an imaging region from respective different directions. The information processing apparatus 10 outputs, based on the determination, information that enables recognition of a satisfying state of a predetermined condition regarding image capturing of the imaging region from a plurality of directions, the satisfying state being a state that changes at least in accordance with a relationship between the plurality of directions.

20 Claims, 14 Drawing Sheets

(56) References Cited

U.S. PATENT DOCUMENTS

| | | | |
|---|---|---|---|
| 2018/0091741 A1* | 3/2018 | Ida | H04N 23/63 |
| 2019/0364265 A1* | 11/2019 | Matsunobu | H04N 13/194 |
| 2022/0172474 A1* | 6/2022 | Takahashi | H04N 23/90 |

FOREIGN PATENT DOCUMENTS

| | | | |
|---|---|---|---|
| JP | 2018207252 A | 12/2018 | |
| JP | 2019009766 A | 1/2019 | |
| WO | 2018142705 A1 | 8/2018 | |

\* cited by examiner

INFORMATION PROCESSING APPARATUS, INFORMATION PROCESSING METHOD, AND RECORDING MEDIUM

CROSS-REFERENCE TO RELATED APPLICATIONS

This application is a Continuation of International Patent Application No. PCT/JP2020/018786, filed May 11, 2020, which claims the benefit of Japanese Patent Application No. 2019-093733, filed May 17, 2019, both of which are hereby incorporated by reference herein in their entirety.

TECHNICAL FIELD

The present disclosure relates to a system that captures images of an imaging region using a plurality of image capturing apparatuses.

BACKGROUND ART

Recently, a system has been used that captures images of a predetermined imaging region using a plurality of image capturing apparatuses from respective different directions. For example, there is a monitoring system that captures images of a monitoring region from a plurality of directions using a plurality of image capturing apparatuses installed so as not to form a blind spot. Moreover, for example, there is a technology in which synchronized image capturing is performed using a plurality of image capturing apparatuses that are installed at different positions, and a virtual viewpoint image whose viewpoint can be freely changed is generated using a plurality of captured images acquired from the image capturing. Specifically, three-dimensional shape data of an object included in a plurality of captured images is generated on the basis of the plurality of captured images, and rendering processing based on the position and direction of a virtual viewpoint is performed to generate a virtual viewpoint image.

In such a system, it is required to install each image capturing apparatus so as to be appropriately oriented or at an appropriate position. PTL 1 discloses that parameters representing the positions of a plurality of respective image capturing apparatuses in a standardized coordinate system are determined using a plurality of images obtained by capturing images of the same marker using the image capturing apparatuses. By using the technology in PTL 1, it can be checked whether the position of each of the installed image capturing apparatuses is shifted from its predetermined, appropriate position.

CITATION LIST

Patent Literature

PTL 1 Japanese Patent Laid-Open No. 2018-207252

However, only by determining parameters regarding the individual image capturing apparatuses, there may be a case where it is difficult to determine whether the plurality of image capturing apparatuses, which capture images of an imaging region, satisfy as a whole a predetermined condition. For example, in order to generate a high quality virtual viewpoint image of an imaging region, it is required to install the plurality of image capturing apparatuses such that images of each position in the imaging region are captured from a plurality of directions. It is not easy for the user to determine whether the condition like this is satisfied from the parameters regarding the individual image capturing apparatuses.

SUMMARY

An information processing apparatus obtains a parameter for specifying positions and orientations of a plurality of image capturing apparatuses, which capture an imaging region from respective different directions, and outputs, based on the obtained parameter, information that enables recognition of a satisfying state of a specific condition regarding image capturing of the imaging region from a plurality of directions, the satisfying state being a state that changes at least in accordance with a relationship between the plurality of directions.

Further features of the present disclosure will become apparent from the following description of exemplary embodiments with reference to the attached drawings.

DESCRIPTION OF EMBODIMENTS

In the following, an exemplary embodiment of the present disclosure will be described with reference to the drawings. Note that configurations illustrated in the following exemplary embodiment are mere examples, and the present disclosure is not limited to the illustrated configurations.

System Configuration

Figure 1:
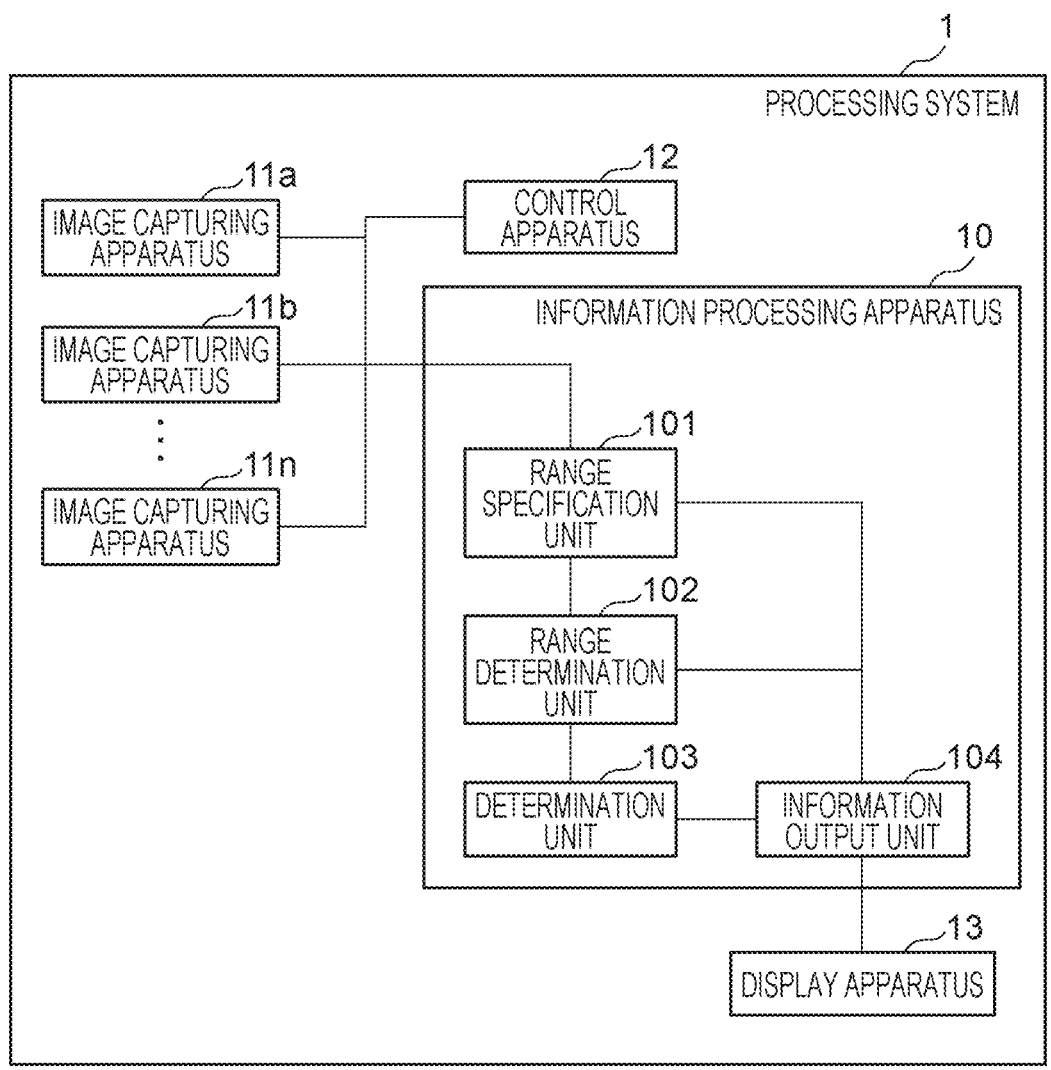
FIG. 1 is a diagram illustrating an example of the configuration of a processing system.

FIG. 1 is a diagram illustrating an example of the configuration of a processing system 1. The processing system 1 includes an information processing apparatus 10, a plurality of image capturing apparatuses 11, a control apparatus 12, and a display apparatus 13. The information processing apparatus 10 includes a range specification unit 101, a range determination unit 102, a determination unit 103, and an information output unit 104.

The processing system 1 includes the plurality of image capturing apparatuses, which are image capturing apparatuses 11a to 11n. In the present exemplary embodiment, in a case where these image capturing apparatuses are not distinguished from each other, the image capturing apparatuses are simply denoted as image capturing apparatuses 11. The plurality of image capturing apparatuses 11 are disposed at respective different positions and acquire, by capturing images of an imaging target region from a plurality of directions, a plurality of captured images to be used to generate a virtual viewpoint image.

The imaging target region is, for example, a sports ground where a sport event such as a soccer game or a karate match takes place or a stage where a concert or a play is performed. The plurality of image capturing apparatuses 11 are installed at respective different positions so as to surround such an imaging target region and capture images by being synchronized with each other. Note that the plurality of image capturing apparatuses 11 do not have to be installed along the entire perimeter of the imaging target region, and may be installed only in a certain direction corresponding to a portion of the imaging target region due to, for example, installation position limitations. Furthermore, the number of image capturing apparatuses 11 is not limited to the number of image capturing apparatuses illustrated in the example. For example, in a case where the imaging target region is a soccer field, about 30 image capturing apparatuses 11 may be installed around the soccer field. Moreover, image capturing apparatuses 11 having different functions from each other such as a telephoto camera and a wide angle camera may be installed.

A virtual viewpoint image in the present exemplary embodiment is also called a free-viewpoint image and is an image representing a view from a specified virtual viewpoint and generated on the basis of the specified virtual viewpoint and a plurality of captured images acquired by the plurality of image capturing apparatuses 11. A virtual viewpoint image is generated by, for example, a method as described below.

First, a plurality of images (a plurality of viewpoint images) are acquired by the plurality of image capturing apparatuses 11 performing image capturing from respective different directions. Next, a foreground image and a background image are extracted from the plurality of viewpoint images. The foreground image is obtained by extracting a foreground region corresponding to a predetermined object such as a person or a ball, and the background image is obtained by extracting a background region other than the foreground region. A foreground model representing the three-dimensional shape of the predetermined object and texture data for coloring the foreground model are generated on the basis of the foreground image, and texture data for coloring a background model representing the three-dimensional shape of the background such as the sports field is generated on the basis of the background image. The texture data is mapped to the foreground model and the background model, and a virtual viewpoint image is generated by performing rendering in accordance with a virtual viewpoint represented by viewpoint information. Note that a virtual viewpoint image generation method is not limited to this, and various methods may be used such as a method for generating a virtual viewpoint image through a projective transformation of captured images without using a three-dimensional model.

Note that, in the present exemplary embodiment, a case where the plurality of image capturing apparatuses 11 are used to acquire images for generating a virtual viewpoint image will be mainly described; however, use of the images acquired by the plurality of image capturing apparatuses 11 is not limited to generation of a virtual viewpoint image. For example, the plurality of image capturing apparatuses 11 may be installed so as to be able to capture images of a predetermined monitoring region from respective different directions, and the captured images may be used for monitoring.

The plurality of image capturing apparatuses 11 are controlled by the control apparatus 12 and output captured images and setting information regarding image capturing to the information processing apparatus 10. The control apparatus 12 controls input-output of the captured images and setting information by controlling the plurality of image capturing apparatuses 11. The range specification unit 101 receives the captured images and setting information from the image capturing apparatuses 11, determines, for each image capturing apparatus 11, an image capturing appropriate range, whose image can be captured by the image capturing apparatus 11 satisfying a predetermined condition, on the basis of the received captured images and setting information, and outputs the determination results to the range determination unit 102 and the information output unit 104. The range determination unit 102 determines an image capturing appropriate range of the entire system (a range whose images are captured by all the plurality of image capturing apparatuses 11 included in the processing system 1) on the basis of the image capturing appropriate ranges of the respective image capturing apparatuses 11 determined by the range specification unit 101. The range determination unit 102 supplies the determination result to the determination unit 103 and the information output unit 104.

On the basis of the image capturing appropriate range of the entire system received from the range determination unit 102, the determination unit 103 determines whether a predetermined image capturing condition is met and outputs the result to the information output unit 104. On the basis of the information received from the range specification unit 101, the range determination unit 102, and the determination unit 103, the information output unit 104 generates image information for visualization of, for example, information used to have made the determinations or the determination results and outputs the generated information to the display apparatus 13. The display apparatus 13 displays an image on the basis of the information received from the information output unit 104 of the information processing apparatus 10.

Note that the configuration of the processing system 1 is not limited to that of the example illustrated in FIG. 1. For example, the control apparatus 12 and the information processing apparatus 10 may be formed so as to be integrated with each other, or the information processing apparatus 10 and the display apparatus 13 may be formed so as to be integrated with each other. The output destination of the information from the information output unit 104 may be a storage device, which is not illustrated.

Hardware Configuration

Figure 2:
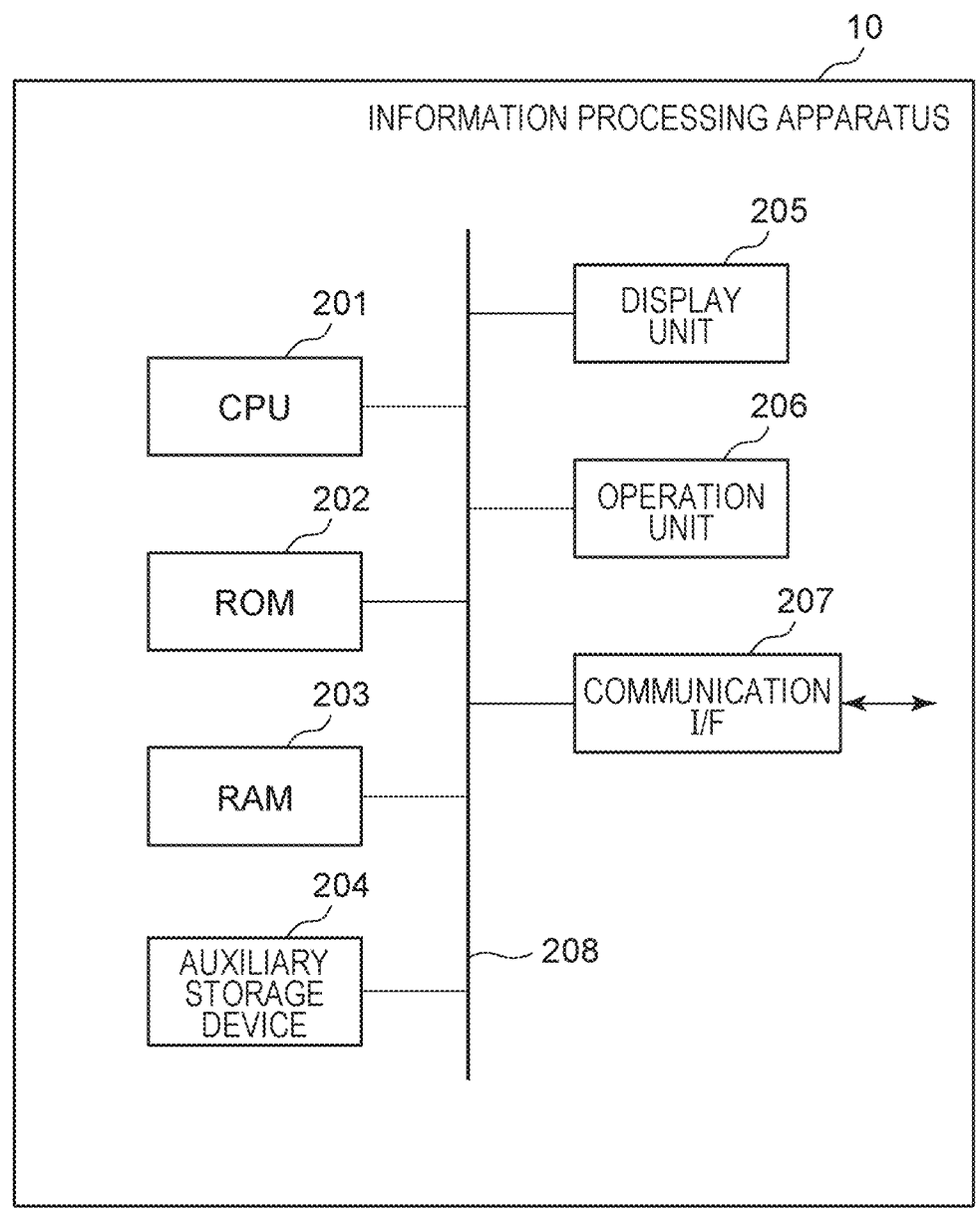
FIG. 2 is a diagram illustrating an example of the hardware configuration of an information processing apparatus.

FIG. 2 is a diagram illustrating an example of the hardware configuration of the information processing apparatus 10. Note that the hardware configuration of the control apparatus 12 is also substantially the same as that of the information processing apparatus 10 to be described below.

The information processing apparatus 10 includes a central processing unit (CPU) 201, a read-only memory (ROM) 202, a random access memory (RAM) 203, an auxiliary storage device 204, a display unit 205, an operation unit 206, a communication interface (I/F) 207, and a bus 208.

By using computer programs or data stored in the ROM 202 or the RAM 203, the CPU 201 realizes the functions of the information processing apparatus 10 by controlling the entirety of the information processing apparatus 10. Note that the information processing apparatus 10 may have one or more dedicated hardware devices that differ from the CPU 201, and at least a portion of processing performed by the CPU 201 may be performed by the one or more dedicated hardware devices. Examples of the one or more dedicated hardware devices include an application-specific integrated circuit (ASIC), a field-programmable gate array (FPGA), and a digital signal processor (DSP). The ROM 202 stores, for example, programs that do not need to be changed. The RAM 203 temporarily stores, for example, a program or data supplied from the auxiliary storage device 204 and data supplied from the outside via the communication I/F 207. The auxiliary storage device 204 includes, for example, a hard disk drive and stores various types of data such as image data.

The display unit 205 includes, for example, a liquid crystal display or a light-emitting diode (LED) and displays, for example, a graphical user interface (GUI) for the user to operate the information processing apparatus 10. Note that the display unit 205 of the information processing apparatus 10 may function as the display apparatus 13. The operation unit 206 includes, for example, a keyboard, a mouse, a joystick, or a touch panel, and inputs various types of command to the CPU 201 upon reception of an operation performed by the user. The CPU 201 operates as a display controller that controls the display unit 205 and an operation controller that controls the operation unit 206.

The communication I/F 207 is used to communicate with an external apparatus of the information processing apparatus 10. For example, in a case where the information processing apparatus 10 is connected to an external apparatus in a wired manner, a cable for communication is connected to the communication I/F 207. In a case where the information processing apparatus 10 has the function of communicating with an external apparatus in a wireless manner, the communication I/F 207 has an antenna. The bus 208 connects various units of the information processing apparatus 10 to each other to convey information.

Figure 3:
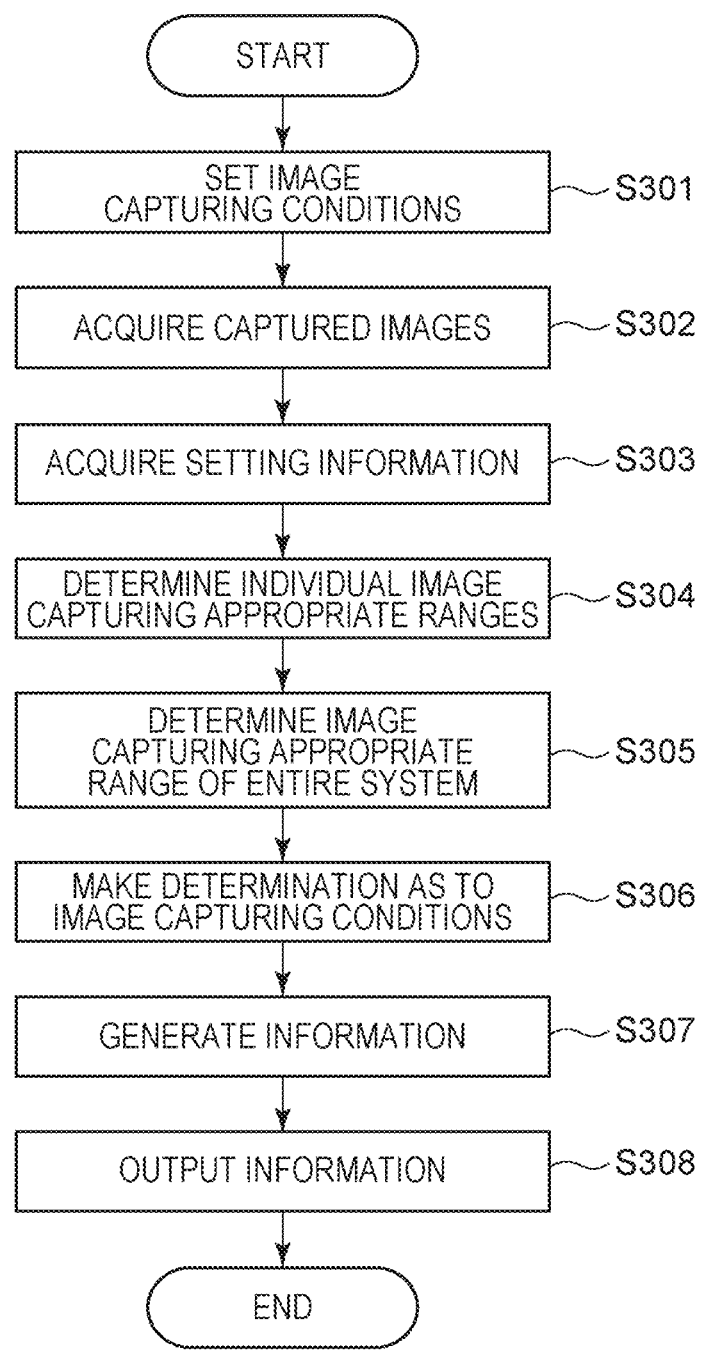
FIG. 3 is a flowchart illustrating an example of processing performed by the information processing apparatus.
Figure 4:
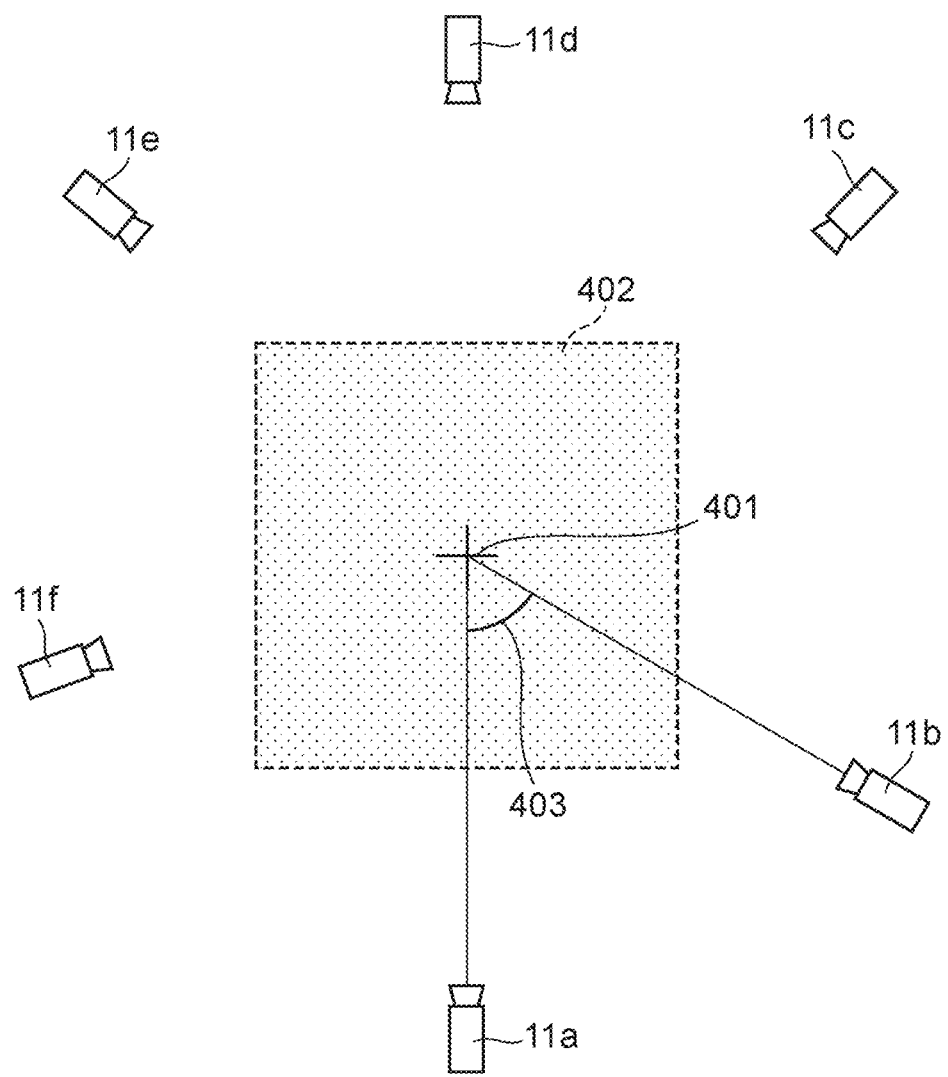
FIG. 4 is a diagram illustrating an installation example of image capturing apparatuses.

In the present exemplary embodiment, the display unit 205 and the operation unit 206 are present inside the information processing apparatus 10; however, at least one out of the display unit 205 and the operation unit 206 may be present as another apparatus outside the information processing apparatus 10. Processing Flowchart The following will describe processing for confirming whether the plurality of image capturing apparatuses 11, which are installed so as to capture images of a region including and near a predetermined point of gaze 401 in an imaging target region 402 from a plurality of directions as illustrated in FIG. 4, satisfy a predetermined image capturing condition. FIG. 3 is a flowchart for describing processing performed by the information processing apparatus 10.

The processing illustrated in FIG. 3 is realized by the CPU 201 of the information processing apparatus 10 loading, into the RAM 203, a program stored in the ROM 202 and executing the program. Note that at least a portion of the processing illustrated in FIG. 3 may be realized by one or more dedicated hardware devices that differ from the CPU 201. The processing illustrated in FIG. 3 is started at a timing at which a command for confirming an image capturing condition is input to the information processing apparatus 10 in a case where the image capturing apparatuses 11 and the information processing apparatus 10 are connected to each other such that communication is possible, and initial settings are set. Note that the timing at which the processing illustrated in FIG. 3 is started is not limited to this.

In S301, the determination unit 103 sets image capturing conditions on the basis of an operation performed by the user through the operation unit 206. In this case, assume that an image capturing direction spacing θ and an imaging resolution p are set as image capturing conditions. FIG. 4 illustrates an installation example of the plurality of image capturing apparatuses 11. Six image capturing apparatuses 11, which are the image capturing apparatuses 11a to 11f, are installed so as to face toward the point of gaze 401 in the imaging target region 402. For example, a situation in which the image capturing conditions are satisfied about a region including and near the point of gaze 401 is a situation as described below. That is, in the situation, all of the six image capturing apparatuses 11 can capture an image of the region including and near the point of gaze with a resolution greater than or equal to the set imaging resolution p, and an apparatus-apparatus angle 403, which is the angle formed by the lines connecting the point of gaze to two adjacent respective image capturing apparatuses 11, is less than the set image capturing direction spacing θ. In a case where the plurality of image capturing apparatuses 11 are installed such that these image capturing conditions are satisfied, a high quality virtual viewpoint image of the region including and near the point of gaze can be generated on the basis of a plurality of captured images, which are acquired. This is because the resolution of a virtual viewpoint image can be increased when the imaging resolution is high and because the shape accuracy of a three-dimensional model used to generate a virtual viewpoint image can be increased when images can be captured from a plurality of directions spaced apart from each other by a spacing less than a threshold. Note that the level of resolution with which each image capturing apparatus 11 can capture an image of a certain region is determined in accordance with the focal length and the number of imaging pixels of the image capturing apparatus 11 and the distance between the region and the image capturing apparatus 11.

Note that the content of the image capturing conditions is not limited to this. For example, either one out of the image capturing direction spacing θ and the imaging resolution p may be set as an image capturing condition, or another condition may also be set. An image capturing condition for a case where only the image capturing direction spacing θ is set is a condition that images of a determination target region (for example, the region including and near the point of gaze 401) can be captured from a plurality of directions and that the plurality of directions are spaced apart from each other by a spacing less than θ. In the present exemplary embodiment, a high quality virtual viewpoint image is generated on the basis of a plurality of images captured from a plurality of directions. Thus, as a relationship that the plurality of directions need to satisfy, a relationship representing that the spacing between the plurality of directions is less than θ is used. Note that the relationship that the plurality of directions regarding image capturing need to satisfy is not limited to this. Moreover, an image capturing condition setting method is not limited to an operation performed by the user. An image capturing condition may be set on the basis of an input to the information processing apparatus 10 from another apparatus, or an image capturing condition may be set using a value stored in the ROM 202 or the RAM 203. The length, width, and height of the imaging target region 402 and three-dimensional coordinates of the point of gaze 401 may be stored in advance in the information processing apparatus 10 or may be input together with an image capturing condition on the basis of an operation performed by the user. In this case, the imaging target region 402 is a rectangular parallelepiped having the point of gaze 401 at its center; however, the imaging target region 402 is not limited to this. The imaging target region 402 may be spherical, semi-spherical, or tubular in shape.

In S302, the range specification unit 101 acquires images captured by the respective image capturing apparatuses 11 in accordance with control performed by the control apparatus 12. Each image acquired in this case includes a specific object such as a two-dimensional marker set at a known position in the imaging target region 402. The number of markers is not limited to a specific value; however, markers are set and the image capturing apparatuses 11 are installed such that, for example, each image includes three or more markers. In S303, the range specification unit 101 acquires setting information regarding image capturing from each image capturing apparatus 11. The setting information includes, for example, information representing the focal length of the image capturing apparatus 11 and information representing the number of vertical imaging pixels and the number of horizontal imaging pixels of the image capturing apparatus 11.

In S304, the range specification unit 101 determines an internal parameter and an external parameter of the image capturing apparatuses 11 on the basis of the captured images acquired in S302 and the setting information acquired in S303. The range specification unit 101 determines, for each image capturing apparatus 11, the image capturing appropriate range of the image capturing apparatus 11 on the basis of these parameters. The internal parameter is information regarding the focal length and the number of imaging pixels of the image capturing apparatus 11. The external parameter is information regarding the position and orientation of the image capturing apparatus 11. An internal parameter K is expressed as in the following Equation (1) by treating a principal point as the center of an image.

$$K = \begin{bmatrix} f & 0 & \frac{width}{2} \\ 0 & f & \frac{height}{2} \\ 0 & 0 & 1 \end{bmatrix} \quad (1)$$

In Equation (1), "width" denotes the number of horizontal pixels of a captured image, "height" denotes the number of vertical pixels of the captured image, and f denotes focal length.

An external parameter T is obtained by solving a PnP problem on the basis of two-dimensional coordinates of the position of a marker detected from a captured image acquired in S302 and known three-dimensional coordinates of a marker in the imaging target region 402 and is expressed by a matrix with 4 rows and 4 columns.

Figure 5:
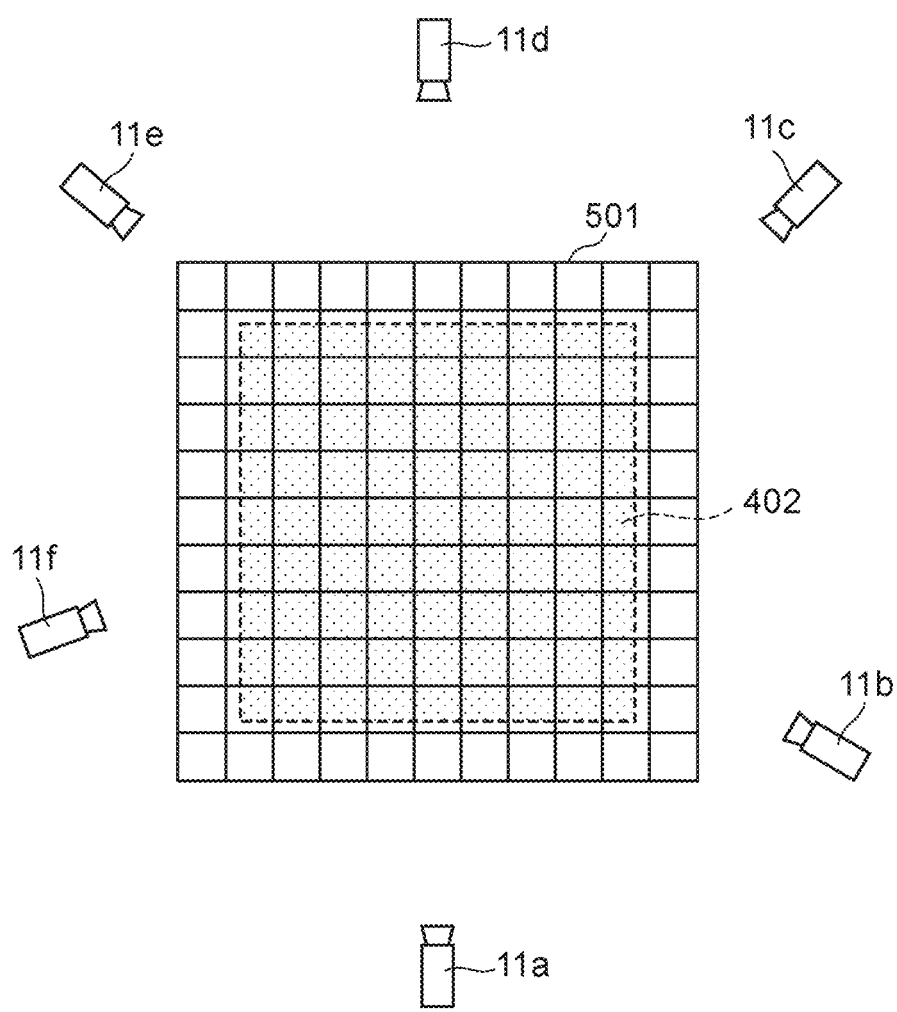
FIG. 5 is a diagram illustrating a voxel space including an imaging target region.

By using the internal parameter K and the external parameter T of a certain image capturing apparatus 11 among the image capturing apparatuses 11, it can be determined whether the image capturing apparatus 11 can capture, with a resolution greater than or equal to the imaging resolution p set in S301, an image of a plurality of voxels 501 illustrated in FIG. 5 and forming a space including the imaging target region 402. An actual resolution $p_b$ of a voxel 501 at the position represented by three-dimensional coordinates (x, y, z) is calculated from Equation (2) given below.

$$s \begin{bmatrix} u_b \\ v_b \\ 1 \end{bmatrix} = KT \begin{bmatrix} x \\ y \\ z \\ 1 \end{bmatrix}, s' \begin{bmatrix} u_t \\ v_t \\ 1 \end{bmatrix} = KT \begin{bmatrix} x \\ y \\ z+a \\ 1 \end{bmatrix} \quad (2)$$

$$p_b = \frac{a}{\sqrt{(u_t - u_b)^2 + (v_t - v_b)^2}}$$

In Equation (2), ($u_b$, $v_b$) represents the coordinates of a bottom end of the voxel 501, ($u_t$, $v_t$) represents the coordinates of a top end of the voxel 501, and a denotes voxel size. The range formed by the voxels 501 that satisfy Equation (3) given below is calculated as an image capturing appropriate range of the image capturing apparatus.

$$u_b \geq 0 \& u_b < width \& v_b \geq 0 \& v_b < helgh \& p_b \geq p \quad (3)$$

That is, the range whose image can be captured by a certain image capturing apparatus with a resolution greater than or equal to the set imaging resolution p will be the image capturing appropriate range of the image capturing apparatus.

Note that a method for determining an image capturing appropriate range is not limited to the one described above. In addition, the definitions of an image capturing appropriate range differ in accordance with set image capturing conditions. For example, in a case where the set image capturing conditions do not include a condition as to resolution, the image capturing appropriate range of a certain image capturing apparatus may be a range whose image can be captured by the image capturing apparatus (a range included in a captured image). Parameters determined by the range specification unit 101 and regarding the image capturing apparatus 11 are not limited to parameters representing the position, the orientation, the focal length, and the number of pixels of the image capturing apparatus 11. For example, by acquiring a parameter representing an operation state of the image capturing apparatus 11 as setting information, the range specification unit 101 may determine whether the image capturing apparatus 11 is in a normal state in which normal image capturing is possible or in an abnormal state in which normal image capturing is not possible. The range specification unit 101 may treat an image capturing apparatus 11 that is in the abnormal state as an image capturing apparatus for which an image capturing appropriate range is not present. Alternatively, the range specification unit 101 may determine only a specific parameter such as, for example, the position and orientation of an image capturing apparatus 11 on the basis of a captured image and may use preset values for other parameters.

In S305, the range determination unit 102 determines an image capturing appropriate range of the entire system on the basis of the image capturing appropriate ranges of the plurality of respective image capturing apparatuses 11 determined in S304 by the range specification unit 101. In this case, the range where the image capturing appropriate ranges of the plurality of image capturing apparatuses 11 overlap is treated as the image capturing appropriate range of the entire system. Note that the image capturing appropriate range of the entire system is not limited to this. The range that is partly included in at least any one of the image capturing appropriate ranges of the plurality of image capturing apparatuses 11 may also be treated as the image capturing appropriate range of the entire system. The range determination unit 102 may set a method for determining an image capturing appropriate range on the basis of an operation performed by the user.

In S306, for each of the voxels 501 included in the image capturing appropriate range of the entire system determined in S305, the determination unit 103 determines whether the image capturing conditions set in S501 are satisfied. For example, on the basis of the external parameter of the plurality of image capturing apparatuses 11 whose image capturing appropriate ranges include a voxel 501 that is a determination target, the determination unit 103 determines whether images of the voxel 501 can be captured from a plurality of directions such that the condition as to the image capturing direction spacing θ is satisfied. That is, the determination unit 103 can determine whether, when viewed from the voxel 501 that is a determination target, the difference in direction between two adjacent image capturing apparatuses 11 among the plurality of image capturing apparatuses 11 whose image capturing appropriate ranges include the voxel 501 is less than the image capturing direction spacing θ. The determination unit 103 also determines whether the image capturing appropriate range of the entire system covers the entirety of the imaging target region 402, which is predetermined.

Note that determination regarding the image capturing conditions is not limited to determination performed in units of voxel, and it is sufficient that determination be performed in units of division region when a space including the imaging target region 402 is divided into division regions. Determination regarding the image capturing conditions may be performed only for a specific voxel out of the voxels 501 included in the image capturing appropriate range of the entire system (for example, a voxel 501 including the position of the point of gaze 401).

Figure 6:
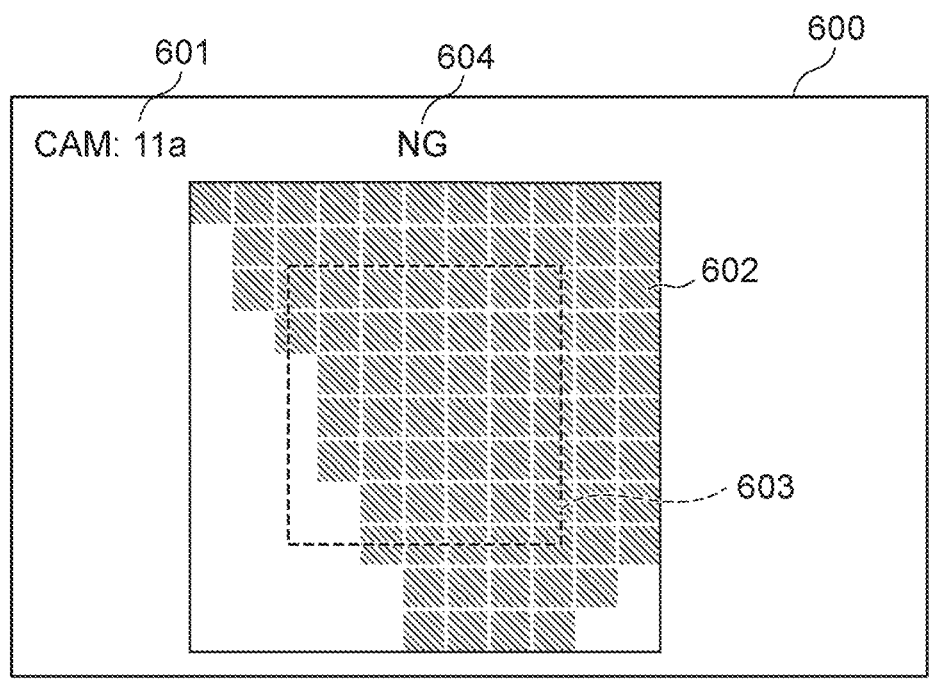
FIG. 6 is a diagram illustrating an example of an image that enables recognition of an image capturing appropriate range of an image capturing apparatus.

In S307, the information output unit 104 generates, in accordance with processing from S304 to S306, information that enables recognition of a satisfying state of the image capturing conditions. In S308, the information generated by the information output unit 104 is output to the display apparatus 13, and the information is displayed on the display apparatus 13. FIG. 6 illustrates an example of the information output from the information output unit 104. An image 600 is an example of image information generated by the information output unit 104 and illustrates an image capturing apparatus ID 601 of the image capturing apparatus 11a, an image capturing appropriate range 602 of the image capturing apparatus 11a, an imaging target region 603, and a determination result 604. The image capturing apparatus ID 601 is identification information of the image capturing apparatus 11a, which is selected as an information display target. The determination result 604 in the example in FIG. 6 represents a determination result as to whether the image capturing appropriate range 602 of the image capturing apparatus 11a covers the entirety of the imaging target region 603. A lower left portion of the imaging target region 603 is not covered, and thus "NG" is displayed. When the entirety of the imaging target region 603 is covered by the image capturing appropriate range 602 by performing wide-angle image capturing through reduction of the focal length of the image capturing apparatus 11a or by changing the orientation of the image capturing apparatus 11a slightly leftward, the determination result 604 becomes "OK".

Note that a method for displaying the determination result 604 is not limited to such a method using a text format. For example, a determination result may be displayed by changing the color of the imaging target region 603. The content of a determination is not limited to this. Another determination result may also be displayed in a similar manner in the image 600.

In the example in FIG. 6, the image capturing appropriate range is two-dimensionally displayed as an aerial view. In this case, three-dimensional information may be converted into a two-dimensional image through projection by displaying the image capturing appropriate range 602, in which areas of two-dimensional positions are filled, the areas of the two-dimensional positions corresponding to the image capturing appropriate range in which all the voxels 501 in a predetermined height range such as 0 to 5 m with respect to ground are included. Note that the way in which the image capturing appropriate range is displayed is not limited to this, and the image capturing appropriate range may be visualized as three-dimensional information. In this manner, the user can recognize that the image capturing appropriate range is not sufficiently large in the height direction. A region included in the field of vision of the image capturing apparatus 11 but excluded from the image capturing appropriate range due to insufficient resolution and a region outside the field of vision of the image capturing apparatus 11 may be displayed in a distinguishable manner by, for example, color-coding the regions. By color-coding regions in accordance with their values of the resolution $p_b$, the degree to which the resolution of each region is insufficient may be made visually recognizable.

Figure 7:
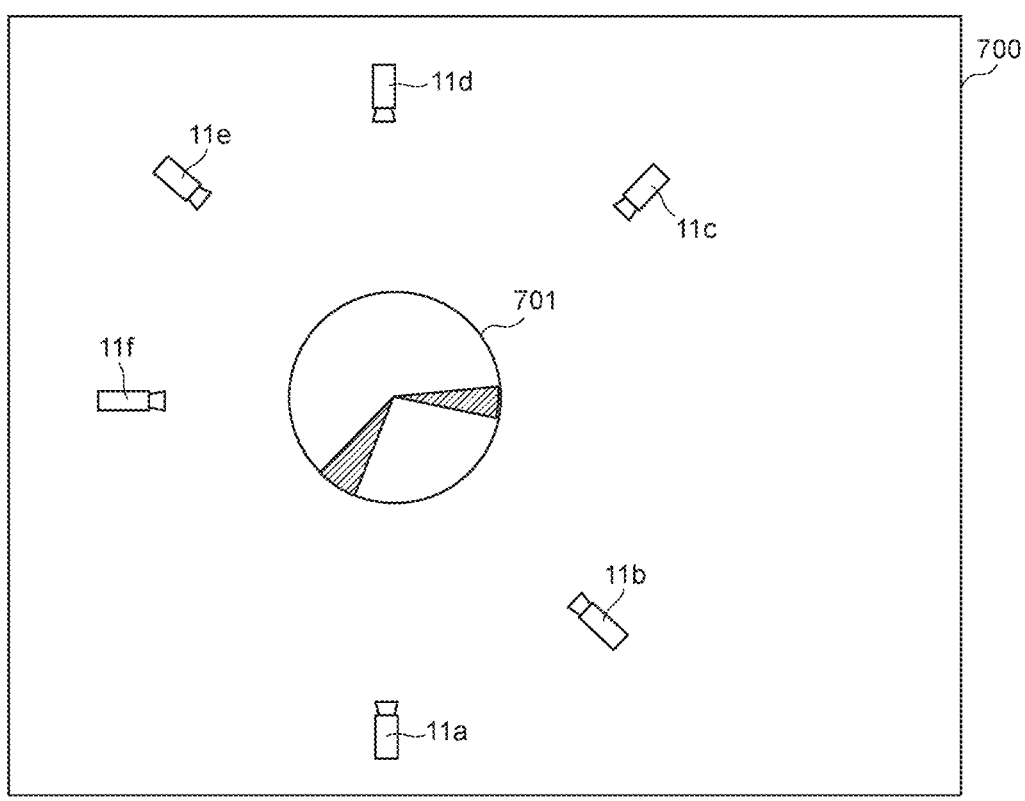
FIG. 7 is a diagram illustrating an example of an image that enables recognition of a determination result of an image capturing condition.

FIG. 7 illustrates another example of the information output by the information output unit 104. An image 700 includes images of the plurality of image capturing apparatuses 11 and a circular indicator 701 representing directions where an image capturing apparatus 11 is not present when viewed from a selected position in the imaging target region 402. The selected position in the example in FIG. 7 is the voxel 501 including the point of gaze 401. A right direction portion and a lower left direction portion of the indicator 701 corresponding to the directions where an image capturing apparatus 11 is not present with respect to the voxel 501 are colored. That is, this illustrates a case where the difference between the direction where the image capturing apparatus 11a is positioned and the direction where the image capturing apparatus 11f is positioned with respect to the point of gaze 401 is greater than or equal to the set image capturing direction spacing θ. Furthermore, this illustrates a case where the difference between the direction where the image capturing apparatus 11b is positioned and the direction where the image capturing apparatus 11c is positioned is also greater than or equal to the image capturing direction spacing θ.

In a case where the spacing between the image capturing apparatus 11b and the image capturing apparatus 11c and the spacing between the image capturing apparatus 11f and the image capturing apparatus 11a are reduced from the state in FIG. 7, the condition as to the image capturing direction spacing θ is satisfied, and the colored portions in the indicator 701 disappear. The image 700 output by the information output unit 104 is an example of information that enables recognition as to whether images of a region including and near the point of gaze 401 can be captured from a plurality of directions such that the condition as to the image capturing direction spacing θ is satisfied. In this manner, by causing the display apparatus 13 to display an image as illustrated in FIG. 7, the user can easily recognize whether an image capturing condition for generating a high quality virtual viewpoint image of a region including and near the point of gaze is satisfied. For example, when it becomes clear that an image capturing apparatus 11 is not positioned in a specific direction when viewed from the point of gaze 401, it can be determined that a virtual viewpoint image corresponding to a virtual viewpoint from which the point of gaze 401 is seen from that direction is of low image quality.

Note that the information output by the information output unit 104 is not limited to image information. For example, the information output unit 104 may output text information representing whether the image capturing conditions are satisfied. Moreover, for example, the information output unit 104 may output, to the display apparatus 13, a flag representing a determination result as to the image capturing conditions and coordinate information representing the image capturing appropriate range, and the display apparatus 13 may generate image information on the basis of these pieces of information.

This concludes description of the processing performed by the information processing apparatus 10 and illustrated in FIG. 3. Note that in the description of S304 above, the external parameter of each image capturing apparatus 11 is calculated on the basis of the position of the marker detected from the captured image acquired in S302, and the internal parameter of each image capturing apparatus 11 is calculated from the setting information acquired in S303. Note that the way in which the internal parameter and the external parameter of each image capturing apparatus 11 are calculated to determine the image capturing appropriate range is not limited to this.

For example, the range specification unit 101 may calculate the external parameter on the basis of an operation through which the user has specified, on the captured image, a point whose three-dimensional coordinates are known. Alternatively, for example, the external parameter may be calculated by performing model fitting using an image captured by the image capturing apparatus 11 and a three-dimensional environment model associated with the imaging target region. Alternatively, for example, the relative position and orientation of each image capturing apparatus 11 may be obtained on the basis of a correspondence relationship between image feature points in a plurality of images captured by the plurality of image capturing apparatuses 11. The external parameter of one image capturing apparatus 11 is determined by using the method as described above, and the external parameters of the other image capturing apparatuses 11 may be obtained by treating the one image capturing apparatus 11 as a reference. In a case where an image capturing apparatus 11 that can electrically change its panning or tilting or a pan head is used, the external parameter may be calculated on the basis of pan-tilt control information. Specifically, the range specification unit 101 acquires a pan setting value and a tilt setting value, and the external parameter after the change of panning or tilting may be calculated on the basis of the external parameter calculated using the setting values obtained before the change of panning or tilting and the setting values obtained after the change of panning or tilting. To obtain the internal parameter, the range specification unit 101 may perform camera calibration or may use information embedded in an image file such as EXIF information.

Grouping of Image Capturing Apparatuses

In the following, a modification will be described in which the way in which the image capturing apparatuses 11 are installed is changed. In the present modification, to generate a high quality virtual viewpoint image of a wide region that is not limited to a region including and near the point of gaze, the image capturing apparatuses 11 are installed such that images of each position in a predetermined imaging target region can be captured with a resolution greater than or equal to a threshold from directions the number of which is greater than or equal to a predetermined number. The information processing apparatus 10 outputs information that enables the user to recognize whether such installation is realized. The configuration of the processing system 1 in the present modification is substantially the same as that described using FIG. 1, and the hardware configuration of the information processing apparatus 10 is substantially the same as that described using FIG. 2. In the following, points that differ from those of the exemplary embodiment described using FIGS. 1 to 7 will be mainly described.

Figure 8:
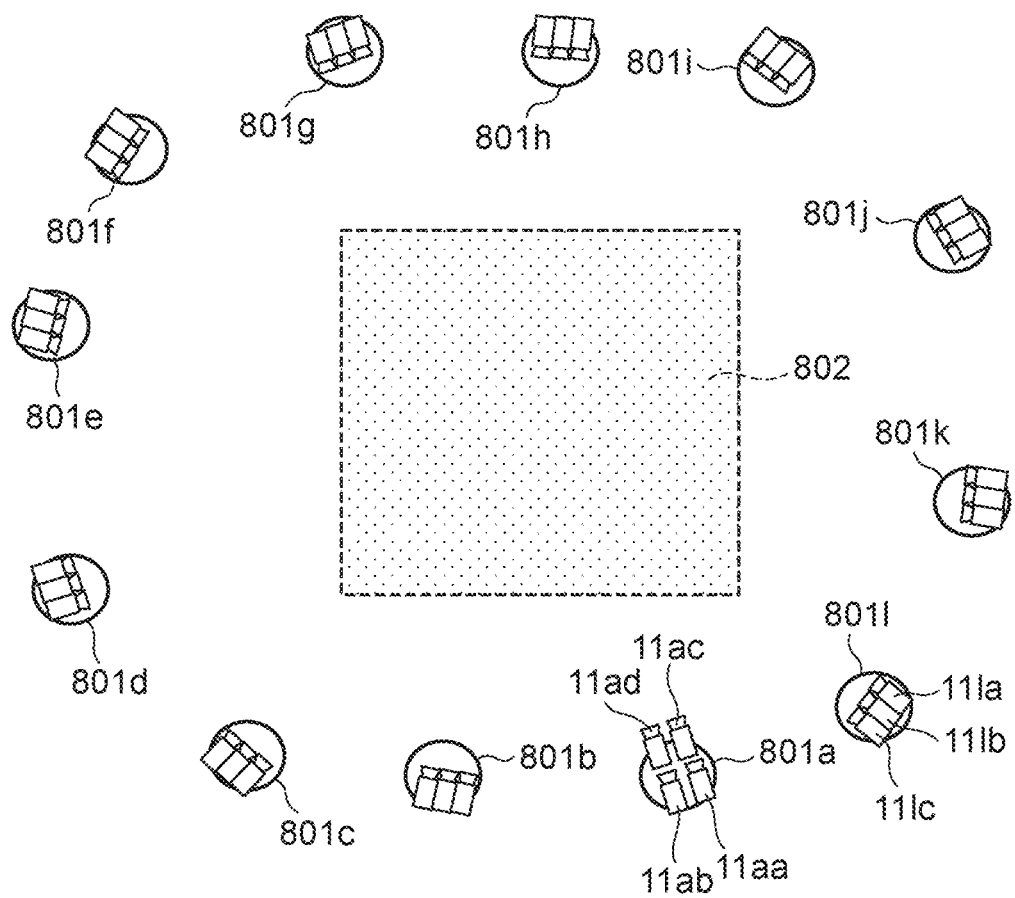
FIG. 8 is a diagram illustrating an example of group arrangement of image capturing apparatuses 11.

FIG. 8 illustrates an installation example of the image capturing apparatuses 11. Four image capturing apparatuses 11, which are image capturing apparatuses 11aa to 11ad, are positioned in substantially the same direction with respect to an imaging target region 802, and these image capturing apparatuses 11 are treated as a group 801a. Similarly, groups 801b to 8011 each include a plurality of image capturing apparatuses 11. Note that the groups do not have to have the same number of image capturing apparatuses 11, and the numbers of image capturing apparatuses 11 are not limited to those in the example illustrated in FIG. 8.

Figure 9A:
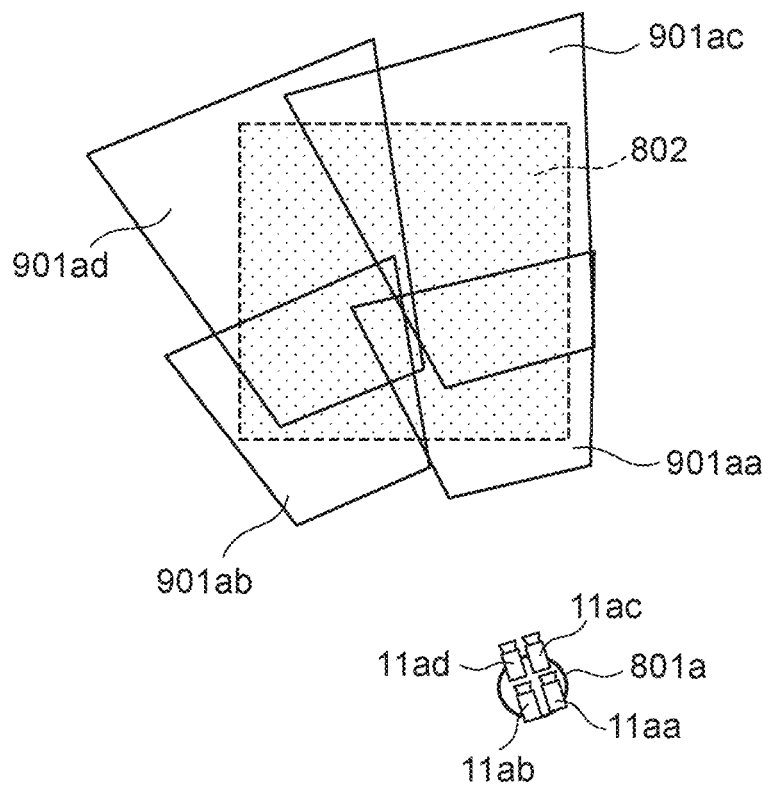
FIG. 9A is a diagram illustrating the fields of view of image capturing apparatuses belonging to a group.
Figure 9B:
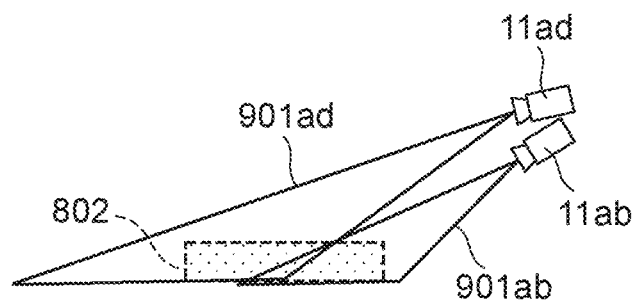
FIG. 9B is a diagram illustrating the fields of view of the image capturing apparatuses belonging to the group.

The plurality of image capturing apparatuses 11 included in each group are installed such that each position in the imaging target region 802 is included in at least any one of the fields of view of these image capturing apparatuses 11. FIG. 9A illustrates the fields of view of the image capturing apparatuses 11 included in the group 801a. A region 901aa, a region 901ab, a region 901ac, and a region 901ad are included in the field of vision of the image capturing apparatus 11aa, that of the image capturing apparatus 11ab, that of the image capturing apparatus 11ac, and that of the image capturing apparatus 11ad, respectively. FIG. 9B illustrates a lateral view of the field of vision of the image capturing apparatus 11ad and that of the image capturing apparatus 11ab.

In processing performed by the information processing apparatus 10 in the present modification, points that differ from the content that has already been described will be mainly described using FIG. 3. In setting of image capturing conditions in S301, the determination unit 103 sets the number of image capturing directions, which is denoted by n, as an image capturing condition in addition to the imaging resolution p. A situation in which these image capturing conditions are satisfied about a position in the imaging target region 802 is a situation in which images of the position can be captured from directions the number of which is greater than or equal to the number of image capturing directions n with a resolution greater than or equal to the imaging resolution p. In a case where the plurality of image capturing apparatuses 11 are installed such that these image capturing conditions are satisfied, a high quality virtual viewpoint image can be generated on the basis of a plurality of captured images, which are acquired. Note that the image capturing apparatuses 11 belonging to the same group are positioned in directions that are close to each other, and thus the number of directions from which images of a certain position are to be captured is determined on the basis of the number of groups that can capture images of the position. Note that information representing the group structure of the image capturing apparatuses 11 may be stored in advance in the information processing apparatus 10 or may be input together with an image capturing condition on the basis of an operation performed by the user.

In determination of the image capturing appropriate range of the entire system in S305, the range determination unit 102 first determines, for each group, the image capturing appropriate range of the group. Specifically, the range whose images can be captured by the plurality of image capturing apparatuses 11 included in the group with a resolution greater than or equal to the imaging resolution p is treated as the image capturing appropriate range of the group. The range constituted by the voxels 501 included in the image capturing appropriate ranges of the groups the number of which is greater than or equal to the number of image capturing directions n is determined to be the image capturing appropriate range of the entire system. Both the image capturing appropriate range of the entire system and the image capturing appropriate ranges of the respective groups are output to the determination unit 103 and the information output unit 104.

Figure 10:
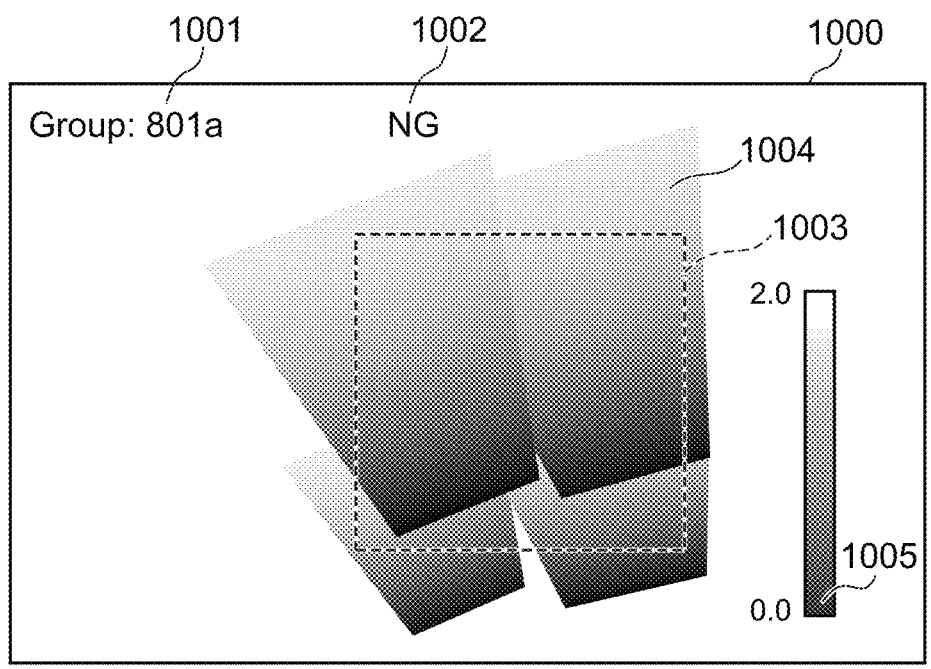
FIG. 10 is a diagram illustrating an example of an image that enables recognition of an image capturing appropriate range of a group.

In S306, it is determined whether the image capturing appropriate range determined in S305 covers the entirety of the imaging target region 802. For each voxel 501 in the imaging target region 802, the number of groups whose image capturing appropriate ranges include the voxel 501 is determined. In S307, the information output unit 104 generates information corresponding to processing from S304 to S306. The information output unit 104 may generate information regarding the image capturing appropriate ranges of the respective groups as illustrated in FIG. 10 instead of the information regarding the image capturing appropriate ranges of the respective image capturing apparatuses 11 as described using FIG. 6.

An image 1000 illustrates a group ID 1001 of the group 801a, an image capturing appropriate range 1004 of the group 801a, an imaging target region 1003, a determination result 1002, and a resolution color bar 1005. The group ID 1001 is identification information of the group 801a, which is selected as an information display target. The image capturing appropriate range 1004 is colored in accordance with the resolutions of respective positions in the image capturing appropriate range 1004. The resolution color bar 1005 illustrates a correspondence relationship between color and resolution. The determination result 1002 in the example in FIG. 10 represents a determination result as to whether the image capturing appropriate range 1004 covers the entirety of the imaging target region 1003. A bottom center portion of the imaging target region 1003 is not covered, and thus "NG" is displayed. By changing the orientation of the image capturing apparatus 11aa, which captures an image of the lower right region of the imaging target region 1003 in FIG. 10, slightly leftward or by performing wide-angle image capturing through reduction of the focal length of the image capturing apparatus 11ab, which captures an image of the lower left region of the imaging target region 1003 in FIG. 10, the entirety of the imaging target region 1003 is covered by the image capturing appropriate range 1004. As a result of this, the determination result 1002 becomes "OK". By displaying such information on the display apparatus 13, the user can easily check the image capturing appropriate ranges of the respective groups and determination results as to the image capturing conditions, and the amount of effort can be reduced compared to a case where the user checks the image capturing appropriate ranges of the image capturing apparatuses 11 on an image capturing apparatus basis.

Figure 11:
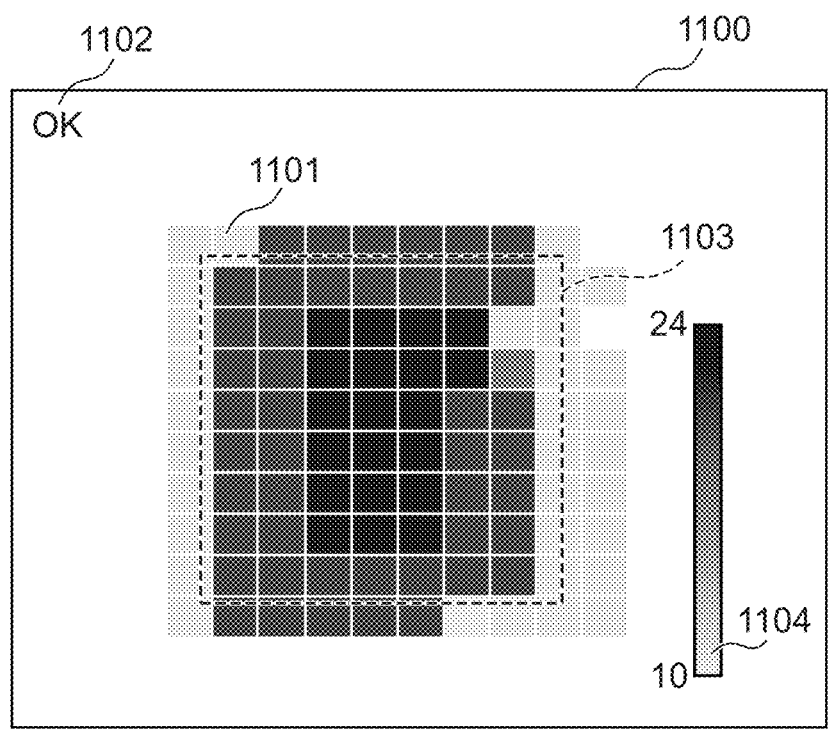
FIG. 11 is a diagram illustrating an example of an image that makes it possible to recognize whether an image capturing condition is satisfied.

FIG. 11 illustrates another example of the information output by the information output unit 104. An image 1100 includes an image capturing appropriate range 1101 of the entire system, a determination result 1102 as to whether the image capturing appropriate range 1101 covers the entirety of an imaging target region 1103, and a number-of-directions color bar 1104. The image capturing appropriate range 1101 is displayed in a heat map format in which, regarding positions in the range, each position is colored in accordance with the number of directions from which images of the position can be captured. The number-of-directions color bar 1104 illustrates a correspondence relationship between the number of directions from which image capturing is possible and color. The example in FIG. 11 illustrates a case where, in the imaging target region 1103, images of a region including and near the center of the imaging target region 1103 can be captured from many directions, and images of a peripheral region in the imaging target region 1103 can be captured from a few directions.

The imaging target region 1103 includes a plurality of division regions (for example, voxels 501). On the basis of image information regarding the image capturing appropriate range 1101 illustrated in FIG. 11, for each division region, it can be recognized whether the image capturing conditions are satisfied. On the basis of information regarding the determination result 1102 illustrated in FIG. 11, it can be recognized whether the image capturing conditions are satisfied in all of the plurality of division regions included in the imaging target region 1103.

The image 1100 output by the information output unit 104 is an example of information that enables recognition as to whether images of each position in the imaging target region 1103 can be captured from a plurality of directions such that the condition as to the number of image capturing directions n is satisfied. By causing the display apparatus 13 to display an image as illustrated in FIG. 11, the user can easily recognize whether, for each position in the imaging target region 1103, the image capturing conditions are satisfied and recognize the number of directions from which images of the position can be captured. That is, in the imaging target region 1103, the user can easily determine positions for which a high quality virtual viewpoint image can be generated and positions for which a virtual viewpoint image may be of low image quality.

Note that, in the example illustrated in FIG. 11, the lower limit of the heat map is set to ten, which is a value to which the number of image capturing directions n is set, and a region for which the number of directions from which image capturing is possible is less than or equal to ten is colored with the background color of the image 1100. Note that the lower limit of the heat map is not limited to ten and may be set to zero or one. The heat map is not limited to a heat map based on the number of directions from which images of each position can be captured (the number of groups), and a heat map based on the number of image capturing apparatuses 11 that can capture images of each position may be displayed. That is, the information output unit 104 may output information representing the number of image capturing apparatuses 11 that can capture images of each position. In a case where an image capturing condition as to the imaging resolution p is set, the information output by the information output unit 104 is information representing the number of image capturing apparatuses that can capture images of each position with a resolution greater than or equal to the imaging resolution p. Outputting of information representing the number of image capturing apparatuses 11 can also be applied to a case where the image capturing apparatuses 11 are not classified into groups (for example, the case of arrangement as illustrated in FIG. 4). The image capturing appropriate range 1101 may also be displayed three-dimensionally and in a heat map format.

Note that the image capturing appropriate range of the entire system may be determined regardless of the number of image capturing directions n. For example, the image capturing appropriate range of the entire system may be a range that is included in at least any one of the image capturing appropriate ranges of the groups or may be a range that is included in at least any one of the image capturing appropriate ranges of the image capturing apparatuses 11. For example, in a case where the set image capturing conditions do not include a condition as to the imaging resolution p, the image capturing appropriate range of each group may be a range whose images can be captured by at least any one of the plurality of image capturing apparatuses 11 belonging to the group.

Pan-Tilt Control of Image Capturing Apparatuses

In the above, examples of the case based on the premise that when the plurality of image capturing apparatuses 11 are appropriately installed such that the image capturing condition are satisfied, image capturing is performed while keeping the installation state have been mainly described. In the following, a modification applied to a case where the control apparatus 12 can pan-tilt control image capturing apparatuses 11 that are capturing images will be described. As a system that can perform pan-tilt control while the image capturing apparatuses 11 are capturing images, there is, for example, a monitoring system in which a plurality of image capturing apparatuses 11 capture images of a monitoring region.

Figure 12:
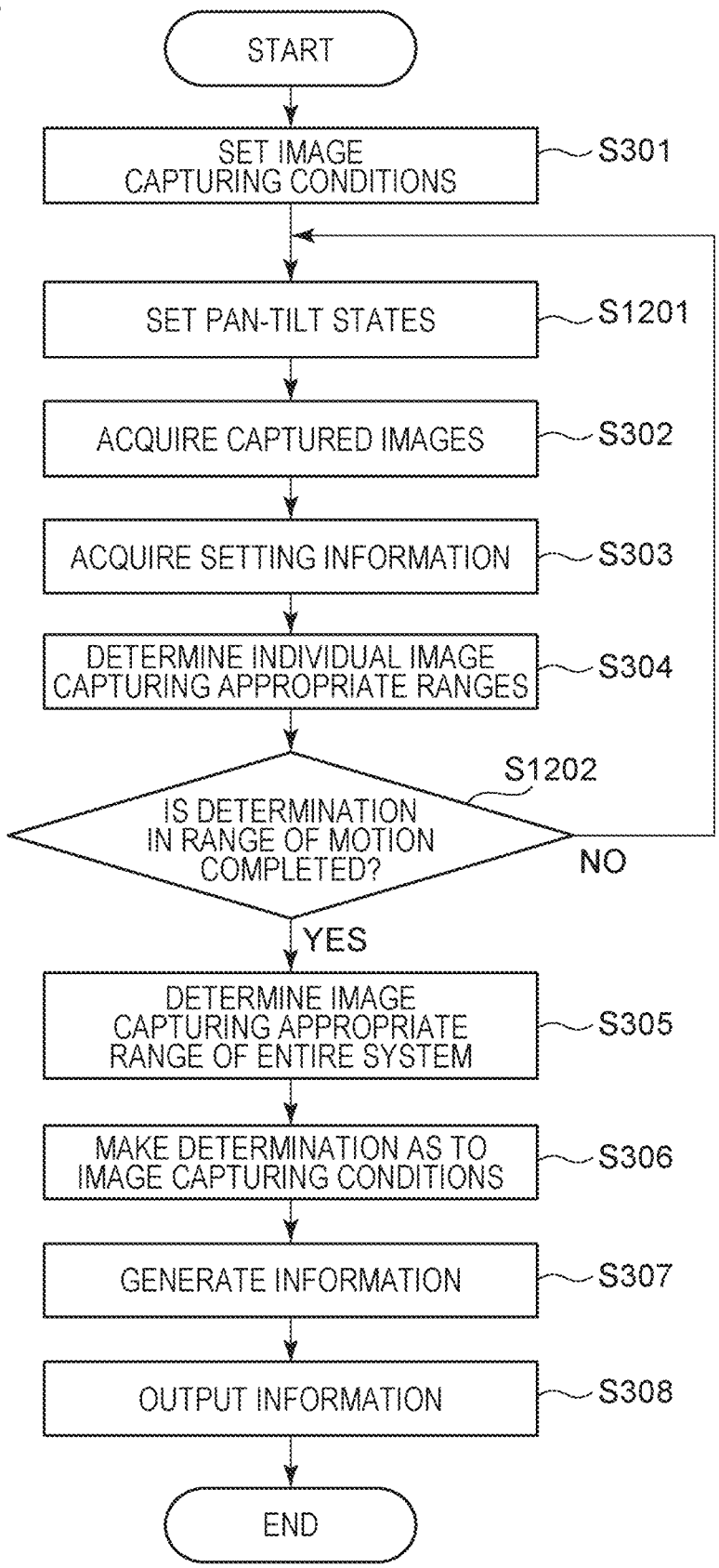
FIG. 12 is a flowchart illustrating an example of processing performed by an information processing apparatus 10.

FIG. 12 is a flowchart illustrating processing performed by the information processing apparatus 10 in the present modification. Processes substantially the same as those described using FIG. 3 will be denoted by the same reference numerals. In the following, differences from the processing described above will be mainly described.

In S301, image capturing conditions are set similarly to as in the processing described above. Note that in a case where there is a wall, an obstruction or the like in an imaging target region to be monitored, determination of the image capturing appropriate range of the imaging target region is affected. Thus, the range specification unit 101 acquires environment information regarding the imaging target region including the wall or the obstruction (for example, a three-dimensional model) together with the image capturing conditions. The range specification unit 101 may acquire the environment information on the basis of an operation input by the user or acquire the environment information from an external apparatus. The range specification unit 101 acquires information regarding the range of pan-tilt motion of each image capturing apparatus 11 as the setting information regarding the image capturing apparatus 11.

In S1201, the range specification unit 101 sets the pan-tilt state of each image capturing apparatus 11 to an initial state through the control apparatus 12. In processing from S302 to S304, the image capturing appropriate range of each image capturing apparatus 11 is determined similarly to as in the processing described so far. After completion of processing in S304, the process returns to S1201, the range specification unit 101 changes the pan-tilt state of each image capturing apparatus 11. Processing from S302 to S304 is performed again to determine the image capturing appropriate range of each image capturing apparatus 11 for the changed pan-tilt state. In this case, for each image capturing apparatus 11, four loops of processing from S302 to S304 are performed using respective combinations of a minimum value and a maximum value for panning and a minimum value and a maximum value for tilting. Note that the number of times processing for determining the image capturing appropriate range of the image capturing apparatus 11 is performed is not limited to this, and this determination processing may be performed while more finely changing the pan-tilt state. In S1202, in a case where it is determined that determination of the image capturing appropriate range of each image capturing apparatus 11 is completed in the range of motion of the image capturing apparatus 11, the process proceeds to S305.

Figure 13:
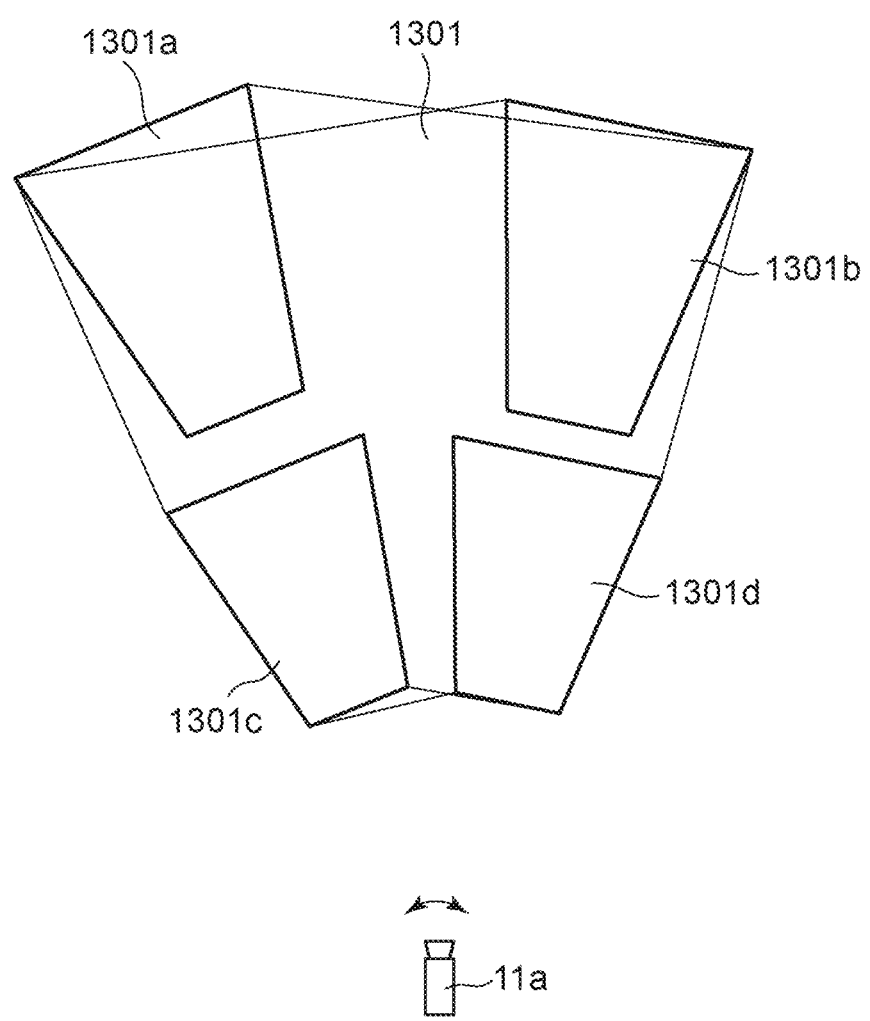
FIG. 13 is a diagram illustrating a temporary image capturing range of an image capturing apparatus.

In S305, the range determination unit 102 determines the image capturing appropriate range of the entire system. Specifically, the range determination unit 102 first obtains, for each image capturing apparatus 11, a temporary image capturing range that can be included in the image capturing appropriate range of the image capturing apparatus 11 by changing the pan-tilt state of the image capturing apparatus 11. In the processing described above, only the image capturing appropriate range based on the minimum values and maximum values for panning and tilting is obtained, and thus the image capturing appropriate range corresponding to other pan-tilt settings is determined by interpolation. For example, as illustrated in FIG. 13, a region surrounded by straight lines connecting the vertexes of a plurality of image capturing appropriate ranges 1301a, 1301b, 1301c, and 1301d determined for the same image capturing apparatus 11a to each other will be a temporary image capturing range 1301 of the image capturing apparatus 11a. Note that an interpolation method is not limited to linear interpolation. For example, interpolation may be performed using a segment of a circle having the image capturing apparatus 11a at its center.

Figure 14:
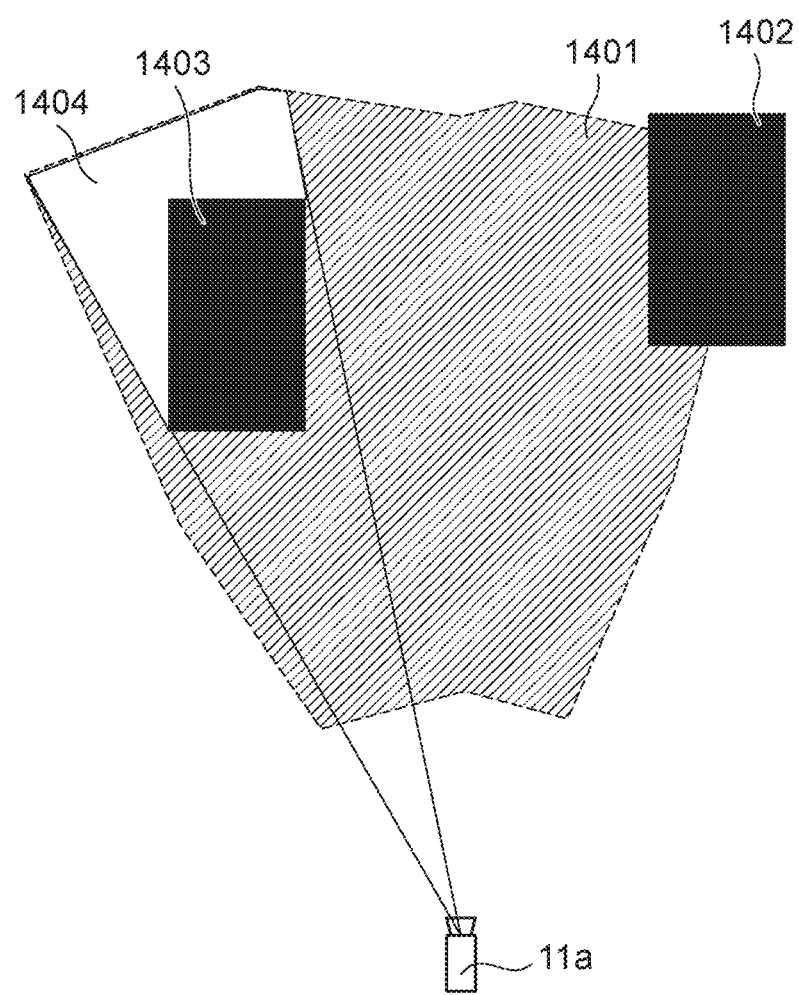
FIG. 14 is a diagram illustrating a pan-tilt image capturing range of the image capturing apparatus.

Next, as illustrated in FIG. 14, the range determination unit 102 eliminates, using the environment information acquired in S301, the ranges of obstructions 1402 and 1403 and a range 1404 whose images cannot be captured due to the obstruction 1403 from the temporary image capturing range 1301 to determine a pan-tilt image capturing range 1401. The range determination unit 102 then determines the image capturing appropriate range of the entire system on the basis of the pan-tilt image capturing ranges 1401 of the respective image capturing apparatuses 11. For example, the range determination unit 102 determines a range that is partly included in any one of the pan-tilt image capturing ranges 1401 of the image capturing apparatuses 11 or a range included in the pan-tilt image capturing ranges 1401 of certain image capturing apparatuses 11 the number of which is greater than or equal to a predetermine number to be the image capturing appropriate range of the entire system. Processing in and after S305 will be substantially the same as processing that has already been described using FIG. 3.

Note that, in the example in FIG. 12, the image capturing appropriate ranges for respective pan-tilt setting values are determined by repeatedly acquiring captured images while changing the pan-tilt states of the image capturing apparatuses 11. Note that when a relationship between a pan-tilt value and the external parameter of each image capturing apparatus 11 is calibrated in advance, calculation of the image capturing appropriate range using a captured image is performed just once, and the image capturing appropriate range corresponding to another pan-tilt setting value may be obtained from the calibrated relationship between the pan-tilt value and the external parameter.

As described above, the information processing apparatus 10 according to the exemplary embodiment described above determines the parameters regarding the plurality of image capturing apparatuses 11, which capture images of an imaging region from respective different directions. The information processing apparatus 10 outputs, on the basis of the determined parameters regarding the plurality of image capturing apparatuses 11, information that enables recognition of a satisfying state of the predetermined conditions regarding capturing of an image of an imaging region, the satisfying state being a state that changes at least in accordance with which directions images of the imaging region are captured from. With this configuration, the user can easily determine whether the plurality of image capturing apparatuses 11, which capture images of the imaging region, as a whole satisfy the predetermined image capturing conditions. In a case where, for example, images captured by the plurality of image capturing apparatuses 11 are used to generate a virtual viewpoint image, the user can easily determine whether a high quality virtual viewpoint image of the imaging region can be generated.

Note that in the exemplary embodiment described above, description has been made assuming that the plurality of image capturing apparatuses 11 are installed at almost the same height. Note that the positions where the plurality of image capturing apparatuses 11 are installed are not limited to this, and the plurality of image capturing apparatuses 11 may be installed at different heights. In this case, the information processing apparatus 10 may treat a plurality of image capturing apparatuses 11 positioned in the same direction (the xy direction) on a horizontal plane with respect to the imaging target region but at different heights as image capturing apparatuses 11 that capture images from the same direction. In contrast, image capturing apparatuses 11 positioned at different heights may be treated as image capturing apparatuses 11 that capture images from different directions because the image quality of a virtual viewpoint image can further be increased by using images captured from a plurality of heights.

The present disclosure can also be realized by supplying a program that realizes one or more functions of the exemplary embodiment described above to a system or an apparatus via a network or a storage medium and reading out and executing the program using one or more processors in a computer of the system or the apparatus. The present disclosure can also be realized by a circuit that realizes one or more functions (for example, an application-specific integrated circuit (ASIC) or the like). The program may be recorded on a computer readable recording medium and supplied.

According to the exemplary embodiment described above, it can be easily determined whether a plurality of image capturing apparatuses that capture images of an imaging region satisfy, as a whole, a predetermined condition.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. An information processing apparatus comprising:
one or more memories storing instructions; and
one or more processors executing the instructions to:
obtain a parameter regarding a plurality of image capturing apparatuses configured to capture an imaging region from directions different from one another; and
output, based on the obtained parameter regarding the plurality of image capturing apparatuses, output information that enables recognition of a satisfying state of a predetermined condition regarding image capturing of the imaging region, the satisfying state being a state that changes at least in accordance with which direction the imaging region is captured from,
wherein output information includes information that indicates in a recognizable manner whether the predetermined condition is satisfied or not for each of a plurality of imaging regions included in a predetermined target region.

2. The information processing apparatus according to claim 1, wherein the predetermined condition is that the imaging region is captured from directions a number of which is greater than a threshold.

3. The information processing apparatus according to claim 1, wherein the predetermined condition is that the imaging region is captured from a plurality of directions between which there is a specific relationship and a number of which is greater than a threshold.

4. The information processing apparatus according to claim 1, wherein the predetermined condition is that the imaging region is captured from a plurality of directions and a spacing between the plurality of direction is less than a threshold.

5. The information processing apparatus according to claim 1, wherein the predetermined condition is that it is possible to capture the imaging region from a plurality of directions and with a resolution greater than a threshold.

6. The information processing apparatus according to claim 1, wherein the parameter is for specifying a focal length and a number of imaging pixels of each of the plurality of image capturing apparatuses.

7. The information processing apparatus according to claim 1, wherein the parameter includes a parameter is for specifying a range of motion of each of the plurality of image capturing apparatuses.

8. The information processing apparatus according to claim 1, wherein the parameter is determined based on a position of an object detected from an image captured by an image capturing apparatus.

9. The information processing apparatus according to claim 1, wherein the obtained parameter is determined based on an image captured by an image capturing apparatus and a three-dimensional model associated with a region captured by the image capturing apparatus.

10. The information processing apparatus according to claim 1, wherein the output information includes information for specifying a number of directions from which the imaging region is to be captured.

11. The information processing apparatus according to claim 1, wherein the output information includes information for specifying a direction where an image capturing apparatus is not present for which it is possible to capture the imaging region.

12. The information processing apparatus according to claim 1, wherein the output information includes information for specifying a number of directions from which the imaging region is captured with a resolution greater than a threshold.

13. The information processing apparatus according to claim 1, wherein the output information includes information for specifying whether image capturing of each of a plurality of imaging regions included in a target region satisfies the predetermined condition.

14. The information processing apparatus according to claim 1, wherein the output information includes information for specifying whether image capturing of all of a plurality of imaging regions included in a target region satisfies the predetermined condition.

15. The information processing apparatus according to claim 1, wherein the output information includes image information in a heat map format, the image information for specifying, for each of a plurality of imaging regions included in a target region, a number of directions from which the imaging region is captured.

16. The information processing apparatus according to claim 1, the one or more processors further execute the instructions to set the predetermined condition in accordance with a user operation.

17. An information processing method comprising:
obtaining a parameter regarding a plurality of image capturing apparatuses configured to capture an imaging region from directions different from one another; and
outputting, based on the obtained parameter regarding the plurality of image capturing apparatuses, output information that enables recognition of a satisfying state of a predetermined condition regarding image capturing of the imaging region, the satisfying state being a state that changes at least in accordance with which direction the imaging region is captured from,
wherein output information includes information that indicates in a recognizable manner whether the predetermined condition is satisfied or not for each of a plurality of imaging regions included in a predetermined target region.

18. The information processing method according to claim 17, wherein the predetermined condition is that the imaging region is captured from directions a number of which is greater than a threshold.

19. The information processing method according to claim 7, wherein the output information includes information for specifying whether image capturing of each of a plurality of imaging regions included in a target region satisfies the specific condition.

20. A non-transitory computer-readable recording medium storing a program for causing a computer to execute an information processing method, the information processing method comprising:
obtaining a parameter regarding a plurality of image capturing apparatuses configured to capture an imaging region from directions different from one another; and
outputting, based on the obtained parameter regarding the plurality of image capturing apparatuses, output information that enables recognition of a satisfying state of a predetermined condition regarding image capturing of the imaging region, the satisfying state being a state that changes at least in accordance with which direction the imaging region is captured from,
wherein output information includes information that indicates in a recognizable manner whether the predetermined condition is satisfied or not for each of a plurality of imaging regions included in a predetermined target region.

* * * * *